United States Patent
Bern

(10) Patent No.: US 12,248,482 B2
(45) Date of Patent: *Mar. 11, 2025

(54) GENERATING MODIFIED VIEW BASED ON IDENTIFIED SUBSET OF CONTENT ITEMS AND PROVIDING MODIFIED VIEW TO USER ASSOCIATED WITH USER ACCOUNT FOR DISPLAY

(71) Applicant: Dropbox, Inc., San Francisco, CA (US)

(72) Inventor: Nicholas Bern, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,521

(22) Filed: Feb. 6, 2024

(65) Prior Publication Data
US 2024/0176789 A1 May 30, 2024

Related U.S. Application Data

(63) Continuation of application No. 16/845,624, filed on Apr. 10, 2020, now Pat. No. 11,947,549.

(51) Int. Cl.
*G06F 16/00* (2019.01)
*G06F 3/04842* (2022.01)
(Continued)

(52) U.S. Cl.
CPC .... *G06F 16/24578* (2019.01); *G06F 3/04842* (2013.01); *G06F 16/185* (2019.01); *G06F 16/248* (2019.01); *G06F 16/9535* (2019.01)

(58) Field of Classification Search
None
See application file for complete search history.

(56) References Cited

U.S. PATENT DOCUMENTS

| 7,499,925 B2 | 3/2009 | Moore et al. |
| 7,769,794 B2 | 8/2010 | Moore et al. |

(Continued)

FOREIGN PATENT DOCUMENTS

| DE | 60031088 T2 | 5/2007 |
| JP | 2003518683 A | 6/2003 |
| WO | 2019213786 A1 | 11/2019 |

OTHER PUBLICATIONS

English Translation of JP2003518683A—Method and Device for Presenting Data to a User, Jun. 10, 2003, 52 pages.

(Continued)

*Primary Examiner* — Jean M Corrielus
(74) *Attorney, Agent, or Firm* — Polsinelli PC

(57) ABSTRACT

A computing system generates a default view of content items associated with a user account. The default view is representative of an underlying hierarchical structure of the content items associated with the user account. The computing system receives a request to transition from the default view to a modified view of the content items. The computing system ranks the content items based on a predicted likelihood of the user interacting with the particular content item. The computing system identifies the subset of content items for the modified view based on the ranking. The computing system generates the modified view based on the identified subset of the content items. The modified view maintains the underlying hierarchical structure of the content items associated with the user account. The computing system provides the modified view to the user associated with the user account for display.

20 Claims, 10 Drawing Sheets

(51) Int. Cl.
*G06F 16/185* (2019.01)
*G06F 16/2457* (2019.01)
*G06F 16/248* (2019.01)
*G06F 16/9535* (2019.01)

(56) References Cited

U.S. PATENT DOCUMENTS

| | | | |
|---|---|---|---|
| 7,774,444 | B1 | 8/2010 | George et al. |
| 8,117,535 | B2 | 2/2012 | Beyer et al. |
| 9,171,262 | B2 | 10/2015 | Flinn et al. |
| 9,223,463 | B1 | 12/2015 | Kawaguchi et al. |
| 9,395,893 | B1* | 7/2016 | Beausoleil ............ G06F 16/958 |
| 9,830,468 | B2 | 11/2017 | Drewry et al. |
| 9,852,377 | B1* | 12/2017 | Kumar .................... G06N 5/04 |
| 10,102,305 | B1* | 10/2018 | Chang ................... H04L 67/535 |
| 10,410,122 | B2 | 9/2019 | Cohen et al. |
| 11,057,322 | B1 | 7/2021 | Jain et al. |
| 2006/0036568 | A1 | 2/2006 | Moore et al. |
| 2014/0181090 | A1 | 6/2014 | Homsany |
| 2014/0189557 | A1* | 7/2014 | O'Connell, Jr. ...... G06F 16/958 715/767 |
| 2014/0282218 | A1 | 9/2014 | Kaufman et al. |
| 2015/0120763 | A1 | 4/2015 | Grue et al. |
| 2015/0234893 | A1 | 8/2015 | Kaasten et al. |
| 2015/0331842 | A1* | 11/2015 | Costa .................... H04L 67/535 715/202 |
| 2016/0110371 | A1 | 4/2016 | Wetherall et al. |
| 2016/0283502 | A1* | 9/2016 | Beausoleil .............. H04L 51/56 |
| 2016/0321287 | A1 | 11/2016 | Luthra et al. |
| 2017/0185626 | A1* | 6/2017 | Tu ........................ G06F 21/6218 |
| 2018/0096273 | A1* | 4/2018 | Arnott .................... G06Q 10/00 |
| 2018/0189692 | A1* | 7/2018 | Newhouse ............. G06F 16/25 |
| 2018/0189734 | A1* | 7/2018 | Newhouse ............. G06F 16/25 |
| 2018/0349461 | A1* | 12/2018 | Bhoovaraghavan .. G06F 16/275 |
| 2019/0313059 | A1 | 10/2019 | Agarawala et al. |
| 2019/0354934 | A1* | 11/2019 | Lo ......................... G06Q 10/06 |
| 2020/0372073 | A1 | 11/2020 | Dahl et al. |
| 2021/0168110 | A1 | 6/2021 | Marmar et al. |
| 2021/0319345 | A1 | 10/2021 | Kumar |

OTHER PUBLICATIONS

Notice of Allowance from U.S. Appl. No. 16/845,624, mailed Feb. 28, 2024, 2 pages.
Advisory Action from U.S. Appl. No. 16/845,624, mailed Feb. 15, 2022, 3 pages.
Advisory Action from U.S. Appl. No. 16/845,624, mailed Nov. 8, 2022, 03 pages.
Directory Opus, "Part 1/4—Directory Opus 12.10 Tutorial/Highlights," Oct. 5, 2018 [Retrieved on Sep. 12, 2022], 5 pages, Retrieved from the Internet: URL: https://www.youtube.com/watch?v=GGGaof_6-mM&t=618s.
Directory Opus, "Opus12_Reference_Manual," Nov. 28, 2016, downloaded on Sep. 12, 2022 from the Internet URL: http://web.archive.org/web/20161128060739/https://cdn.gpsoft.com.au/Opus12/Opus12_Reference_Manual.zip, pp. 1-1127.
Fileboss, "File Filtering in Explore View—FileBoss, The Power File Manager", Apr. 27, 2017, Retrieved from http://web.archive.org/web/20170427111944/https://www.theutilityfactory.com/summaries/explore-filters.htm, pp. 1-3.
Final Office Action from U.S. Appl. No. 16/845,624, mailed Dec. 3, 2021, 20 pages.
Final Office Action from U.S. Appl. No. 16/845,624, mailed May 18, 2023, 54 pages.
Final Office Action from U.S. Appl. No. 16/845,624, mailed Sep. 23, 2022, 76 pages.
Non-Final Office Action from U.S. Appl. No. 16/845,624, mailed Apr. 5, 2022, 46 pages.
Non-Final Office Action from U.S. Appl. No. 16/845,624, mailed Jan. 19, 2023, 77 pages.
Non-Final Office Action from U.S. Appl. No. 16/845,624, mailed Jun. 22, 2021, 26 pages.
Notice of Allowance from U.S. Appl. No. 16/845,624, mailed Dec. 12, 2023, 11 pages.

* cited by examiner

GENERATING MODIFIED VIEW BASED ON IDENTIFIED SUBSET OF CONTENT ITEMS AND PROVIDING MODIFIED VIEW TO USER ASSOCIATED WITH USER ACCOUNT FOR DISPLAY

CROSS-REFERENCE TO RELATED APPLICATION INFORMATION

This is a continuation of U.S. patent application Ser. No. 16/845,624, filed Apr. 10, 2020, which is incorporated by reference in its entirety.

TECHNICAL FIELD

The present technology pertains to the creation of a graphical user interface, and more specifically pertains to generating an improved user interface that provides users with content they are most likely to interact with or access.

BACKGROUND

Currently, there is no perfect user interface that visually illustrates content with which a user is most likely to interact or access. For example, conventional file managers typically provide users with a view of their file system that mimics the underlying folder structure. Such file managers typically require, however, the user to have knowledge relating to the name and/or location of the content they are looking for. Further, such use of conventional file managers typically relies on users taking initiative and organizing their content accordingly. Since many users today store thousands or even millions of files and folders in their file system, it can be difficult for users to identify a file or folder using conventional file managers alone, especially when users are unfamiliar with the underlying folder structure.

SUMMARY

In some embodiments, a computer-implemented method is disclosed herein. A computing system generates a default view of content items associated with a user account. The default view is representative of an underlying hierarchical structure of the content items associated with the user account. The computing system receives a request to transition from the default view to a modified view of the content items. The modified view includes a subset of the content items contained in the default view. The computing system ranks the content items based on a predicted likelihood of the user interacting with the particular content item. The ranking is performed based at least on the user's past activity. The computing system identifies the subset of content items for the modified view based on the ranking. The computing system generates the modified view based on the identified subset of the content items. The modified view maintains the underlying hierarchical structure of the content items associated with the user account. The computing system provides the modified view to the user associated with the user account for display.

In some embodiments, a non-transitory computer readable medium is disclosed herein. The non-transitory computer readable medium includes one or more sequences of instructions, which, when executed by one or more processors, cause the one or more processors to perform operations. The operations include generating, by a content management system, a default view of content items associated with a user account of the content management system. The default view is representative of an underlying hierarchical structure of the content items associated with the user account. The operations further include transmitting, by the content management system, the default view of the content items to a client device associated with the user account for display. The operations further include receiving, from the client device, a request to transition from the default view to a modified view of the content items. The modified view includes a subset of the content items contained in the default view. The operations further include ranking, by the content management system, the content items based on a predicted likelihood of the user interacting with the particular content item. The ranking is performed based at least on the user's past activity. The operations further include identifying, by the content management system, the subset of content items for the modified view based on the ranking. The operations further include generating, by the content management system, the modified view based on the identified subset of the content items. The modified view maintains the underlying hierarchical structure of the content items associated with the user account. The operations further include transmitting, by the content management system, the modified view to the client device for display.

In some embodiments, a computer-implemented method is disclosed herein. A computing system generates a default view of content items associated with a user account of a user. The default view is representative of an underlying hierarchical structure of content items associated with the user account. A computing system receives a request to transition from the default view to a modified view of the content items. The modified view includes a subset of the content items contained in the default view based on a predicted likelihood of the user interacting with the particular content items. The computing system generates the modified view that includes the subset of the content items that the user is most likely to interact with. The modified view maintains the underlying hierarchical structure of the content items. The computing system receives a second request to transition from the modified view to a flat or radial representation of the subset of the content items represented in the modified view. The computing system generates the flat or radial representation of the subset of content items represented by the modified view based on the underlying hierarchical structure of the content items. The computing system provides the flat or radial representation to the user.

BRIEF DESCRIPTION OF THE DRAWINGS

The above-recited and other advantages and features of the disclosure will become apparent by reference to specific embodiments thereof, which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings.

DETAILED DESCRIPTION

Figure 1:
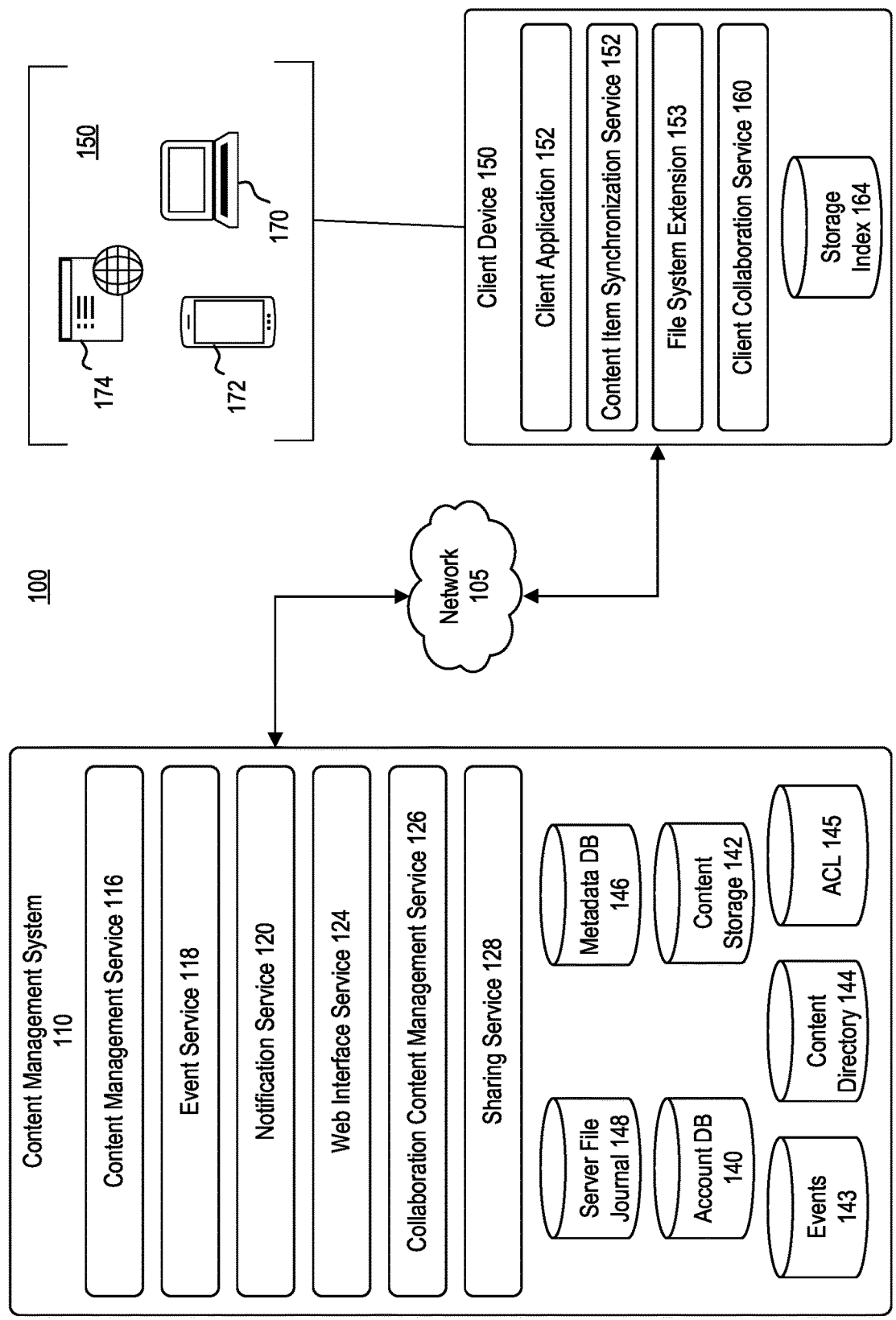
FIG. 1 illustrates an example system configuration of a content management system and client devices, according to example embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The one or more techniques disclosed herein address the need in the art for providing one or more new capabilities of a user interface for displaying relevant content to a user. For example, the one or more techniques described herein provide an improved user interface configured to toggle between various different views of a user's file structure. In some embodiments, the improved user interface may be configured to toggle between a default folder view and a modified folder view. In the modified folder view, a user may be presented with content items (e.g., files, folders, workspaces, links, etc.) that are considered most relevant to the user. In some embodiments, the improved user interface may be configured to toggle between a default folder view and a radial or flat representation of the user's underlying folder structure. In this manner, a user may be provided with a clearer overview of the underlying folder structure.

With respect to the modified folder view, the content management system may be configured to rank the user's content based on the user's interaction with that content. For example, for each interaction the user has with a content item (e.g., modify, edit, move, rename, delete, create, share, etc.), content management system may create an event or event record associated therewith. Based on the one or more events or event records (e.g., past or historical events or records thereof) associated with a given content item, content management system may determine a relevance of that content to the user. In some embodiments, content management system may further consider the events or event records that were triggered by a collaborator of the user. For example, assuming the user is a member of a shared content item (e.g., shared folder or shared file), content management system may consider events or event records that were triggered by fellow collaborators, in addition to the events or event records triggered by the user. In some embodiments, content management system may further consider events or event records based on their creation date. For example, a content item that has been recently created may generally be likely to be accessed soon, and therefore highly ranked by content management system, even though they may not be a history of interaction with that content item. Further, in some embodiments, a user may dictate which content items may be included in the modified folder view by starring or favoriting content items. In this manner, content management system may determine which content a user is most likely to access (e.g., based on frequency and/or creation date) and which content a user has starred or favorited, and provides only those relevant content items to the user for quick access.

With respect to the radial or flat representation of the user's underlying folder structure, content management system may be configured to build the radial or flat representation based on the user's underlying folder structure. For example, content management system may generate a graph-based representation of the user's underlying folder structure, where each node of the graph may correspond to a respective item of content and edges between two nodes may correspond to a location of where the respective item of content resides. In this manner, a user may be able to view their entire file structure in a single display area.

FIG. 1 is a block diagram illustrating a system configuration 100, according to example embodiments. System configuration 100 may include a content management system 110 interacting with a client device 150.

Content management system 110 may include one or more components. For example, as illustrated, content management system 110 may include content management service 116, event service 118, notification service 120, web interface service 124, collaboration content management service 126, and sharing service 128. In some embodiments, content management system 110 may further include one or more storage items. Such storage items may include, but are not limited to, server file journal 148, account database 140, events 143, content directory 144, access control list (ACL) 145, content storage 142, and metadata database 146.

Content management system 110 may communicate with client device 150 via network 105. Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in system configuration 100 to send and receiving information between the components of system configuration 100.

Client device 150 may include one or more components. For example, as illustrated, client device 150 may include client application 152, content item synchronization service 152, file system extension 153, and client collaboration service 160. In some embodiments, client device 150 may further include one or more storage components. As illustrated, client device 150 may include storage index 164.

Accounts

Content management system 110 can store content items in association with accounts, as well as perform a variety of content item management tasks, such as retrieve, modify, browse, and/or share the content item(s) (e.g., collaboration documents). Furthermore, content management system 110 can enable an account to access collaboration document(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of collaboration documents while an engineering group can have access to another set of collaboration documents. An administrator group can modify groups, modify user accounts, etc.

Content Item Storage

A feature of content management system 110 is the storage of content items, which can be stored in content storage 142. As used herein, content items can be any digital data such as documents, collaborative content items, text files, audio files, image files, video files, webpages, executable files, binary files, messages, etc. A content item can also include collections or other mechanisms for grouping content items together with different behaviors, such as folders, zip files, playlists, albums, etc. A collection can refer to a folder, or a plurality of content items that are related or grouped by a common attribute. Content items can also include hyperlinks, shortcuts or placeholder files storing metadata identifying other content items, such as other content items stored on content management system 110 or on a third-party content management system. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 can be a computing device having a local file system accessible by multiple applications resident thereon. Client device 172 can be a computing device wherein content items are only accessible to a specific application or by permission given by the specific application, and the content items are stored either in an application specific space or in the cloud. Client device 174 can be any client device accessing content management system 110 via a web browser and accessing content items via a web interface. While example client devices 170, 172, and 174 are depicted in form fusers such as a laptop, mobile device, or web browser, it should be understood that the descriptions thereof are not limited to devices of these example form fusers. For example, a mobile device such as client 172 might have a local file system accessible by multiple applications resident thereon, or client 172 might access content management system 110 via a web browser. As such, the form fuser should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 156 (which can be integrated with the local file system, or even the operating system kernel) can intercept read, write, copy, move, delete, add, modify, etc. commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110.

Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification.

Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from a specified domain, i.e., from within a corporate network domain.

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 118 can generate an event for such interaction. When event service 118 detects a user interaction with a content item and/or another user, event service 118 can create an event identifier (e.g., unique event identifier) and event type, and associate the event identifier and event type with the user (e.g., user identifier and namespace identifier) to create an event or event record for the interaction. After the event is created, event service 118 can send the event identifier and any information associated with the event to events 143 for storage.

Events 143 can include one or more storage systems, such as one or more databases, for storing events and associated information. In some examples, events 143 can include a distributed database or distributed storage system. Events 143 can receive and store the event data for access by content management system 110.

Presence and Seen State

Content management system 110 can provide information about how users are interacting or have interacted with a content item, such as a shared content item. Content management system 110 can report that a user with whom a content item is shared is currently viewing the content item. For example, client collaboration service 160 can notify notifications service 120 when client device 150 is accessing the content item. Notify notifications service 120 can notify client devices of other users having access to the same content item of the presence of the user of client device 150 with respect to the content item. Content management system 110 (e.g., event service 118) and/or client device 150 can track user interactions with content, such as read or write events, and maintain a history of such events and interactions for a user (e.g., events 143).

Content management system 110 can report a history of user interactions with a shared content item. Collaboration content management service 126 can query data sources such as events 143, metadata database 146, and server file journal 148 to determine that a user has saved the content item, that a user has yet to view the content item, etc., and disseminate this status information using notification service 117 to other users so that they can know who currently is or has viewed or modified the content item.

Collaboration content management service 126 can facilitate comments associated with content, even if a content item does not natively support commenting functionality. Such comments can be stored in metadata database 146.

Collaboration content management service 126 can originate and transmit notifications for users. For example, a user can mention another user in a comment and Collaboration content management service 126 can send a notification to that user that he has been mentioned in the comment. Various other content item events can trigger notifications, including deleting a content item, sharing a content item, etc.

Collaboration content management service 126 can provide a messaging platform whereby users can send and receive instant messages, voice calls, emails, etc.

Collaboration Content Items

Collaboration content management service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 160 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. In addition, in some embodiments, some portions or components of content management system 110 described herein may be included in or integrated with one or more client devices 150. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
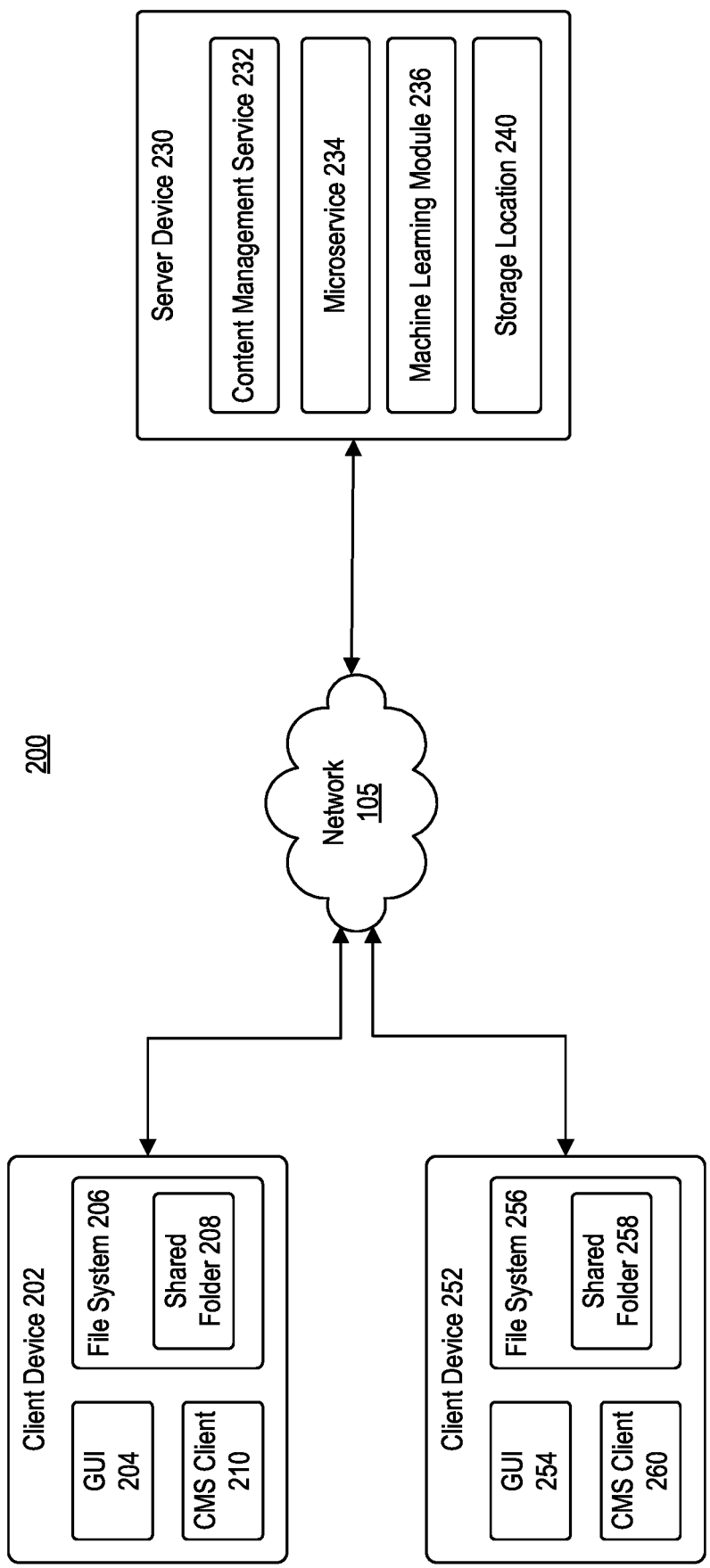
FIG. 2 illustrates an example system configuration of the content management system and client devices of FIG. 1, according to example embodiments.

FIG. 2 is a block diagram of an example system 200, according to example embodiments. For example, system 200 may correspond to system 100 described above. As illustrated, system 200 may include client device 202, client device 252 and content management system 230 communicating via network 205 (similar to network 105).

A user of client device 202 (e.g., client device 150) may create an account with content management system 110. Client device 202 may include a graphical user interface (GUI) 204, a file system 206, and a content management system (CMS) client 210. User of client device 202 may view one or more content items (e.g., files, links, folders, workspaces, etc.) associated with the user's account via GUI 204. For example, GUI 204 may provide user of client device 202 with access to content items associated with the user's account. In some embodiments, GUI 204 may provide a file structure overview. Via GUI 204, user of client device 202 may view, edit, modify, and otherwise interact with content items.

In some implementations, client device 202 may include file system 206. For example, file system 206 may be representative of a portion (e.g., a dedicated folder) of the file system of client device 202 that includes content items being managed by content management system 110. In some embodiments, content items stored in file system 206 may be automatically uploaded to or synchronized with file systems in content management system 110 and/or managed file systems on other user devices (e.g., user device 252).

In some implementations, client device 202 may further include CMS client 210. For example, CMS client 240 (referenced to as content item synchronization service 152) may manage file system 206. When a user adds a content item to file system 206, CMS client 210 may communicate with content management system 230 to synchronize the content item with content management system 230, as described with reference to FIG. 1 above. Similarly, CMS client 210 may monitor items in file system 206 to determine when content items may have been opened, modified, moved, shared, deleted, etc., and which user has performed or is performing operations on the content items within file system 206.

In some implementations, user of client device 202 may share access to a content item with a user of client device 252. In some embodiments, client device 252 may belong to the same user as client device 202. For example, client device 252 may be a user's mobile device, while client device 202 may be the user's desktop or laptop device. In some embodiments, client device 252 may belong to a different user. Client device 252 may be configured similar to client device 202. Client device 252 may include GUI 254, file system 256, and CMS client 260.

User of client device 252 may view one or more files, links, folders, workspaces, etc., associated with the user's account via GUI 254. Via GUI 254, user of client device 252 may view, edit, modify, and otherwise interact with the content items.

In some implementations, client device 252 may include file system 256. For example, file system 256 may be representative of a portion of the file system of client device 252 managed by content management system 110. In some embodiments, content items stored in file system 256 may be automatically uploaded to or synchronized with file systems in content management system 110 and/or managed file systems on other user devices (e.g., user device 202).

In some implementations, client device 252 may further include CMS client 260. For example, CMS client 260 (referenced to as content item synchronization service 152) may manage file system 256. When a user adds a content item to file system 256, CMS client 260 may communicate with content management system 230 to synchronize the content item with content management system device 230, as described with reference to FIG. 1 above. Similarly, CMS client 260 may monitor items in file system 206 to determine content items may have been opened, modified, moved, shared, deleted, etc., and which user has or is performing operations on the content items within file system 206.

Content management system 230 may include CMS service 232, microservice 234, machine learning module 236, and storage location 240. CMS service 232 may be representative of one or more modules discussed above in reference to FIG. 1. For example, CMS service 232 may track a user's interaction with content items associated with the user's account. In some embodiments, the interactions may include, but are not limited to, editing, adding, posting, sharing, deleting, commenting, moving, renaming, and otherwise interacting with or manipulating the content items. Using a specific example, CMS service 232 may track when a user adds a content item to a folder, edits a content item, shares a content item (e.g., a folder or a file) with another user, deletes a content item (e.g., a file or folder), shares a link to a content item, and the like. In some embodiments, CMS service 232 may generate an event for each such interaction. For example, when CMS service 232 detects a user interaction with content associated with the user's account, CMS service 232 may create a unique event identifier and event type, and associate the event identifier and event type with the user to create an event or event record for the interaction. In some embodiments, CMS service may associate event identifier and event type with a user identifier and/or namespace identifier associated with the user. CMS service 232 may store each event or event record in storage location 240.

Although CMS service 232, microservice 234, and machine learning module 236 are discussed as components of content management system 230, those skilled in the art recognize that CMS service 232 may also be a component of client device 252. In other words, the operations discussed with respect to CMS service 232, microservice 234, and machine learning module 236 may be performed remotely at content management system 230 and/or locally at client device 252.

Microservice 234 may be configured to toggle GUI 204 and/or GUI 254 between a default folder view and a modified folder view. For example, as discussed above, keeping content organized in folders takes user time and knowledge regarding how to find content within the organizational hierarchy of the user's content. Via an actionable element on GUI 204 or GUI 254, a user associated with client device 202 or client device 252, respectively, may request microservice 234 to generate an updated GUI corresponding to a modified folder view that includes a subset of content associated with the user. The subset of content may correspond to content that is most relevant to the user at the moment microservice 234 receives the user's request. Via the actionable element, a user may toggle in and out of the modified folder view without losing access to files. Further, in some embodiments, the modified folder view may be adaptive throughout the day, so that the user may be provided with the most up-to-date determination of content relevancy.

To generate modified folder view, microservice 234 may work in conjunction with machine learning module 236 to bound a virtual size of the user's account to visually display content that is most relevant to the user. Machine learning module 236 may be configured to predict the content items with which a user or group of users is likely to access and/or interact. To predict the content items with which a user is likely to interact or access, machine learning module 236 may receive, as input, a plurality of events or event records associated with the user. For example, machine learning module 236 may receive, as input, a plurality of events or event records associated with the user's account (e.g., user's namespace). In some embodiments, machine learning module 236 may further receive, as input, a plurality of events or event records (e.g., one or more) associated with content shared with the user by other users or shared by the user with other users. In such example, machine learning module 236 may receive both events or event records triggered by the user and events or event records triggered by collaborators of a user. Exemplary collaborators may include, for example, authors or users associated with (e.g., having access to and collaborating on) content items shared with or by the user.

In some embodiments, machine learning module 236 may include a separate model or algorithm that is trained and tested for each device type. For example, machine learning module 236 may include a first model dedicated to predicting the content items with which a user or group of users is likely to access and/or interact when the device type is a mobile device, a second model dedicated to predicting the content items with which a user or group of users is likely to access and/or interact when the device type is a tablet, and a third model dedicated to predicting the content items with which a user or group of users is likely to access or interact when the device type is a personal computer or laptop. In some embodiments, machine learning module 236 may include a separate model or algorithm that is trained and tested for each application type. For example, machine learning module 236 may include a first model dedicated to predicting the content items with which a user or group of users is likely to access and/or interact when the application accessed on client device 252 is a browser-based application and a second model dedicated to predicting the content items with which a user or group of users is likely to access and/or interact when the application accessed on client device 252 is a native application.

Generally, machine learning module 236 may include one or more machine learning models or algorithms trained and tested to predict the content items with which a user or group of users is likely to access and/or interact. In some embodiments, one or more machine learning models or algorithms may include, but are not limited to, random forest, support vector machines, artificial (e.g., convolutional, recurrent, etc.) neural networks, clustering models, deep learning models, Bayesian algorithms, reinforcement learning models, and the like.

In some embodiments, predicting the content with which a user is likely to interact or access may include machine learning module 236 scoring content associated with the user based on the retrieved plurality of events or event records. In some embodiments, each event or event record associated with a user's content item may contribute one or more points to that content. In some embodiments, each event or event record may be weighted equally (e.g., each event or event record may be worth a single point). In some embodiments, event or event records may be dynamically weighted. For example, moving a content item to a different folder may be worth less than editing a content item. As another example, creating a workspace may be worth more than renaming a folder.

In some embodiments, predicting the content with which a user is likely to interact or access may include identifying a type of device from which the user is submitting a request. For example, each event or event record may include an indication related to the type of device the user initiated the interaction associated with the event or event record. By doing so, microservice 234 may provide a user with the most relevant content, based on the user's interaction with content on the requesting device. In other words, in some embodiments the modified view generated for a request submitted via the user's laptop may differ from the modified view generated for a request submitted by the same user via the user's mobile device or tablet.

Further, because users may continually interact with content throughout the day, the modified folder view may be adaptive throughout the day to events such as shares, comments, and notifications. In other words, the modified folder view may change in real-time (or near real-time) depending on the user's or the user's collaborators' interactions with the user's content.

In some embodiments, microservice 232 may further be configured to generate a radial (or "flat") view corresponding to the user's content. Via an actionable element on GUI 204 or GUI 254, a user associated with client device 202 or client device 252, respectively, may request microservice 234 to generate an updated GUI that includes a radial or flat view of the user's content. The radial or flat view may be, for example, a graph, allow a user to better understand how their content intuitively clusters together, and may provide users with not only the ability to instantly click on a file many folders deep, but also consolidate similar content, archive unused branches, visually understand their active content, and the like. In some embodiments, the radial or flat view of the user's content may be requested for all of the user's content. In some embodiments, the radial or flat view of the user's content may be requested for a specific folder, such as the folder that is currently being open or viewed by the user. Still further, in some embodiments, the radial or flat view of the user's content may be requested based on the modified view, i.e., the radial or flat view may be generated based on the content the user is most likely to access. That is, in some embodiments, the user can simultaneously request a modified viewed and a radial or flat view, in which case the user can be presented a radial or flat view of only the content items that the user is most likely to access.

Figure 3A:
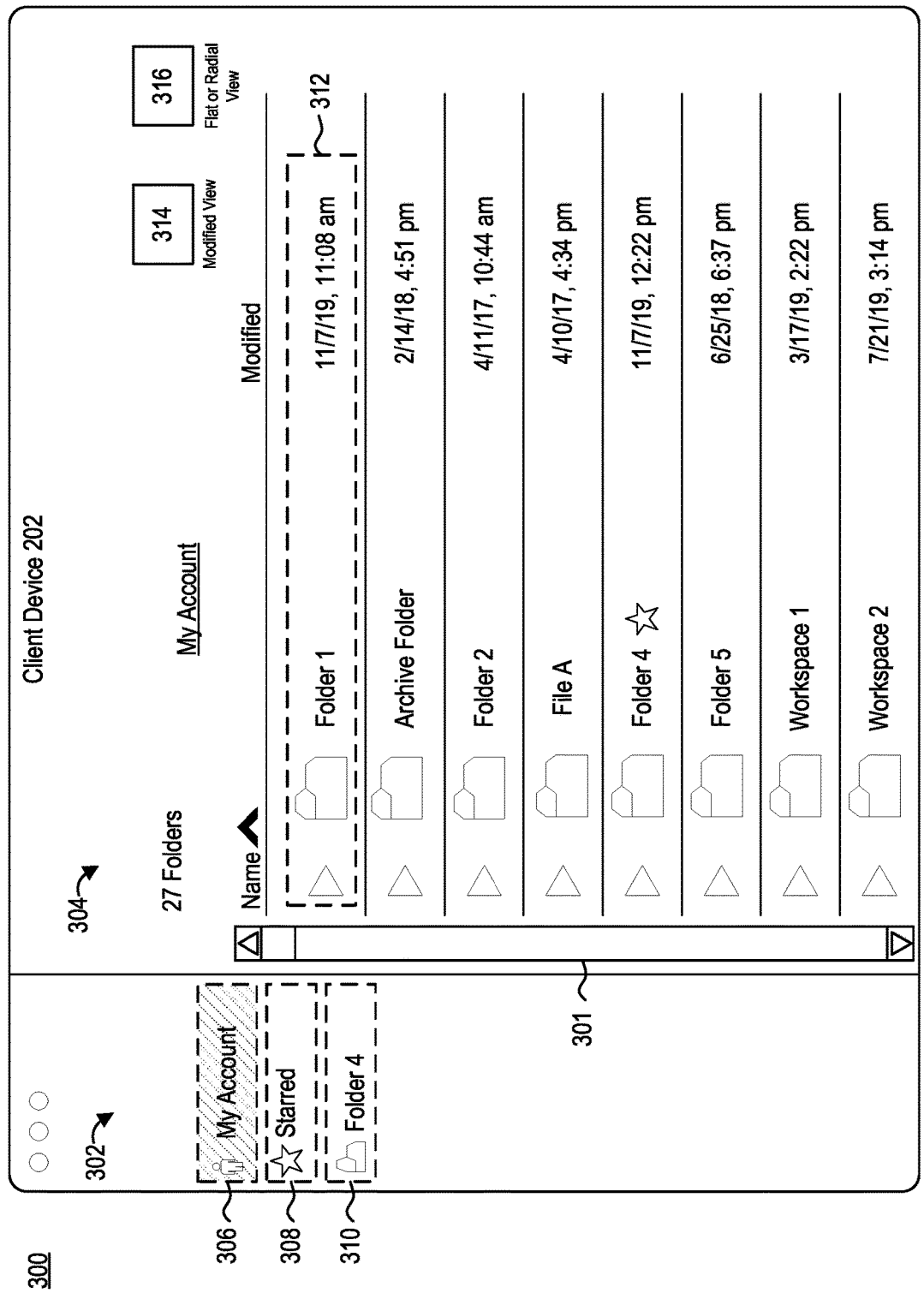
FIG. 3A illustrates an example view of a graphical user interface presenting a default folder view, according to example embodiments.

FIG. 3A illustrates an example view of a graphical user interface 300 presenting a default folder view, according to example embodiments. Graphical user interface 300 (hereinafter "GUI 300") may correspond to GUI 204 and/or GUI 254 of FIG. 2. In some embodiments, GUI 300 may be a web page presented in a web browser application of client device 150. In some embodiments, GUI 300 may be a graphical user interface generated by a native software application executing on client device 150.

As illustrated, GUI 300 may correspond to a default folder view associated with a user's account. GUI 300 may include a first portion 302 and a second portion 304. First portion 302 of GUI 300 may correspond to a navigation pane of GUI 300. First portion 302 may include one or more graphical elements 306-310 (e.g., button, link. etc.) selectable by the user to cause GUI 300 (e.g., the browser or native application) to send a message to content management service requesting information associated with each graphical element 306-310.

Graphical element 306 may correspond to the user's account. Accordingly, upon receiving input via graphical element 306, GUI 300 may request, from content management system 116, all content associated with the user's account. Content management service 116 may deliver the content to GUI 300 so that GUI 300 may display the content on the display associated with client device 150.

Graphical element 308 may correspond to starred content. Starred content may correspond to content that the user has designated as "favorite." Accordingly, upon receiving input via graphical element 308, GUI 300 may request, from content management system 116, starred content associated with the user's account. Content management service 116 may deliver the content to GUI 300 so that GUI 300 may display the content on the display associated with client device 150.

Graphical element 310 may correspond to a folder. A folder may correspond to a storage space in the user's account. In some embodiments, the folder may include content associated therewith. According, upon receiving input via graphical element 310, GUI 300 may request, from content management system 116, all content associated with (or stored in) the selected folder. Content management service 116 may deliver the folder's content to GUI 300 so that GUI 300 may display the content on the display associated with client device 150

Second portion 304 may correspond to a display section of GUI 300. For example, upon the user interacting with graphical element 306, graphical element 308, or graphical element 310, GUI 300 may display content associated with the selection in second portion 304. Second portion 304 may include one or more content items 312. As illustrated, user of client device 150 may have interacted with graphical element 306 corresponding to the user's account. Accordingly, second portion 304 may include one or more content items 312 associated with the user's account. As provided, the user's account may include 27 folders. Although not all content items are illustrated in GUI 300, GUI 300 may include a scroll bar 301, that allows a user to scroll down a list of content items 312.

In some embodiments, second portion 304 may include at least graphical element 314 and graphical element 316. Graphical element 314 may correspond to an instruction to switch from the default folder view to a modified folder view. Accordingly, upon receiving input via graphical element 314, GUI 300 may request that microservice 234 provide the modified folder view to the user. Microservice 234 may, in turn, work in conjunction with machine learning module 236 to generate an updated folder view that includes a subset of content items in the user's account with which the user is most likely to interact or access. In some embodiments, the request may be constrained to the current folder that is displayed in second portion 304. For example, if second portion 304 includes content associated with graphical element 306, the modified folder view may be constrained to the user's overall account. Similarly, if second portion 304 includes content associated with graphical element 310, the modified folder view may be constrained to the folder associated with graphical element 310, that is, the modified view may only include a subset of content items within the folder associated with graphical element 310 and not include any content items outside of that folder.

Graphical element 316 may correspond to an instruction to switch from default folder view to a flat or radial view.

Accordingly, upon receiving input via graphical element 316, GUI 300 may request that microservice 234 provide the flat or radial view to the user. Microservice 234 may generate a flat or radial view based on a current selection that is displayed in second portion 304. In some embodiments, the request may be constrained to the current folder that is displayed in second portion 304. For example, if second portion 304 includes content associated with graphical element 306, the flat or radial view may be constrained to the user's overall account. Similarly, if second portion 304 includes content associated with graphical element 310, the flat or radial view may be constrained to the folder associated with graphical element 310.

Generally, once the user selects a default folder view, a modified folder view, and/or a flat or radial view, the selected type of view (also referred to as the selected view mode) may be maintained while the user navigates between or among folders, until the user selects a different view type. This is because microservice 234 maintains the hierarchical structure of content items associated with the user's account when microservice 234 generates either modified folder view or flat or radial view. In this way, a user can navigate from a first folder to a second folder (e.g., the first folder's parent or child folder) from either modified folder view or flat or radial view, and the modified folder view or flat or radial view can be maintained, i.e., the second folder can be presented using the same view in which the first folder was presented. Thus, rather than passively provide users with a flat list of content items that the user is likely to access, microservice 234 generates modified folder view and flat or radial view in a way that maintains the underlying hierarchical structure of the content items.

Figure 3B:
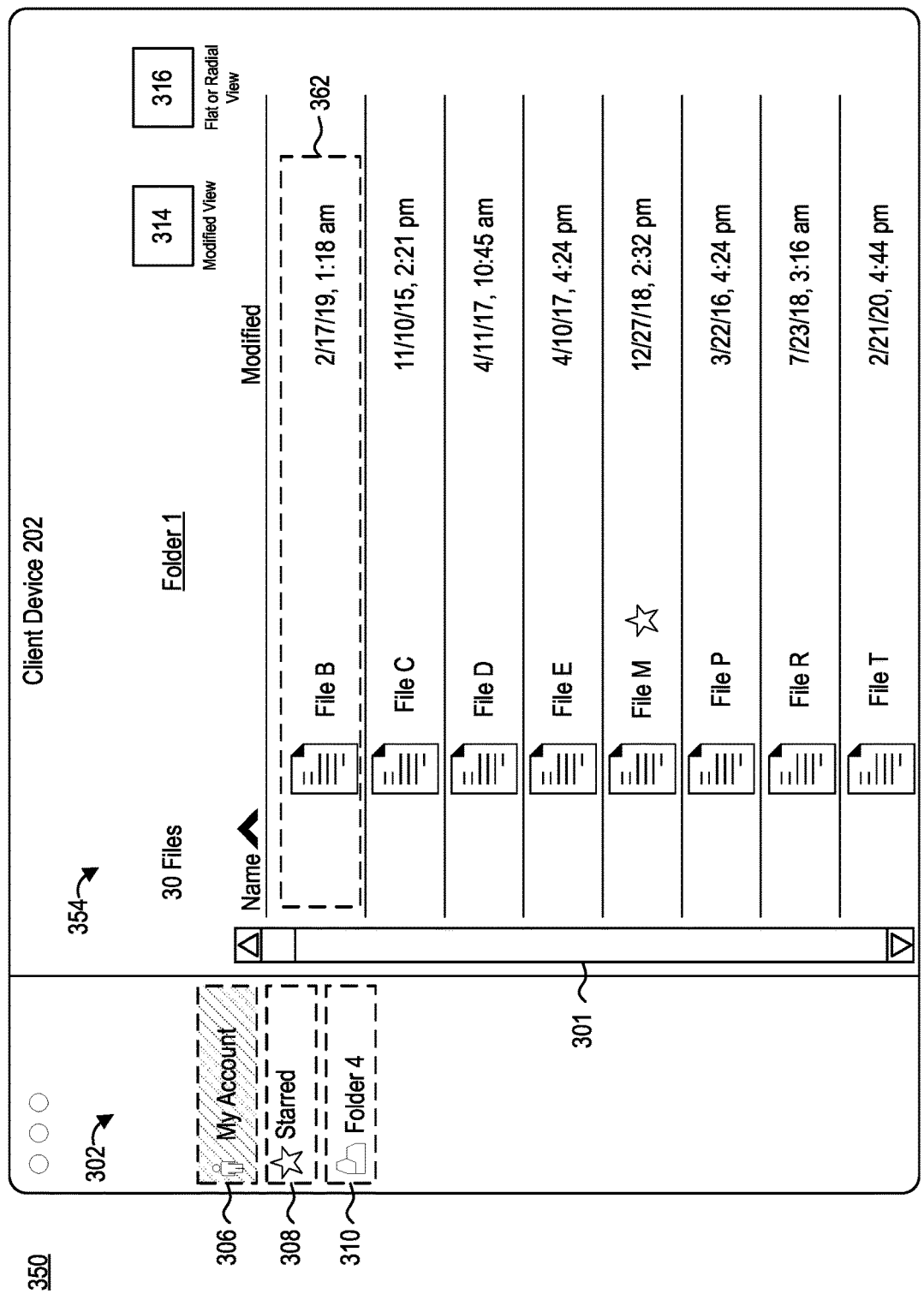
FIG. 3B illustrates an example view of a graphical user interface presenting a default folder view, according to example embodiments.

FIG. 3B illustrates an example view of a graphical user interface 350 presenting a default view of a selected folder, according to example embodiments. Graphical user interface 350 (hereinafter "GUI 350") may correspond to GUI 204 and/or GUI 254 of FIG. 2. In some embodiments, GUI 350 may be a web page presented in a web browser application of client device 150. In some embodiments, GUI 350 may be a graphical user interface generated by a native software application executing on client device 150.

As illustrated, GUI 350 may correspond to a view of Folder 1, when a user selects Folder 1 from GUI 300. GUI 350 may illustrate one or more content items 362 that are associated with Folder 1. For example, GUI 350 may include 30 Files that are associated with Folder 1.

Second portion 354 may correspond to a display section of GUI 300. For example, upon the user selecting Folder 1, GUI 350 may display content associated with or stored in Folder 1. Second portion 354 may include one or more content items 362. As illustrated, user of client device 150 may have interacted with Folder 1 in GUI 300. Accordingly, second portion 354 may include one or more content items 362 associated with the Folder 1.

Figure 4:
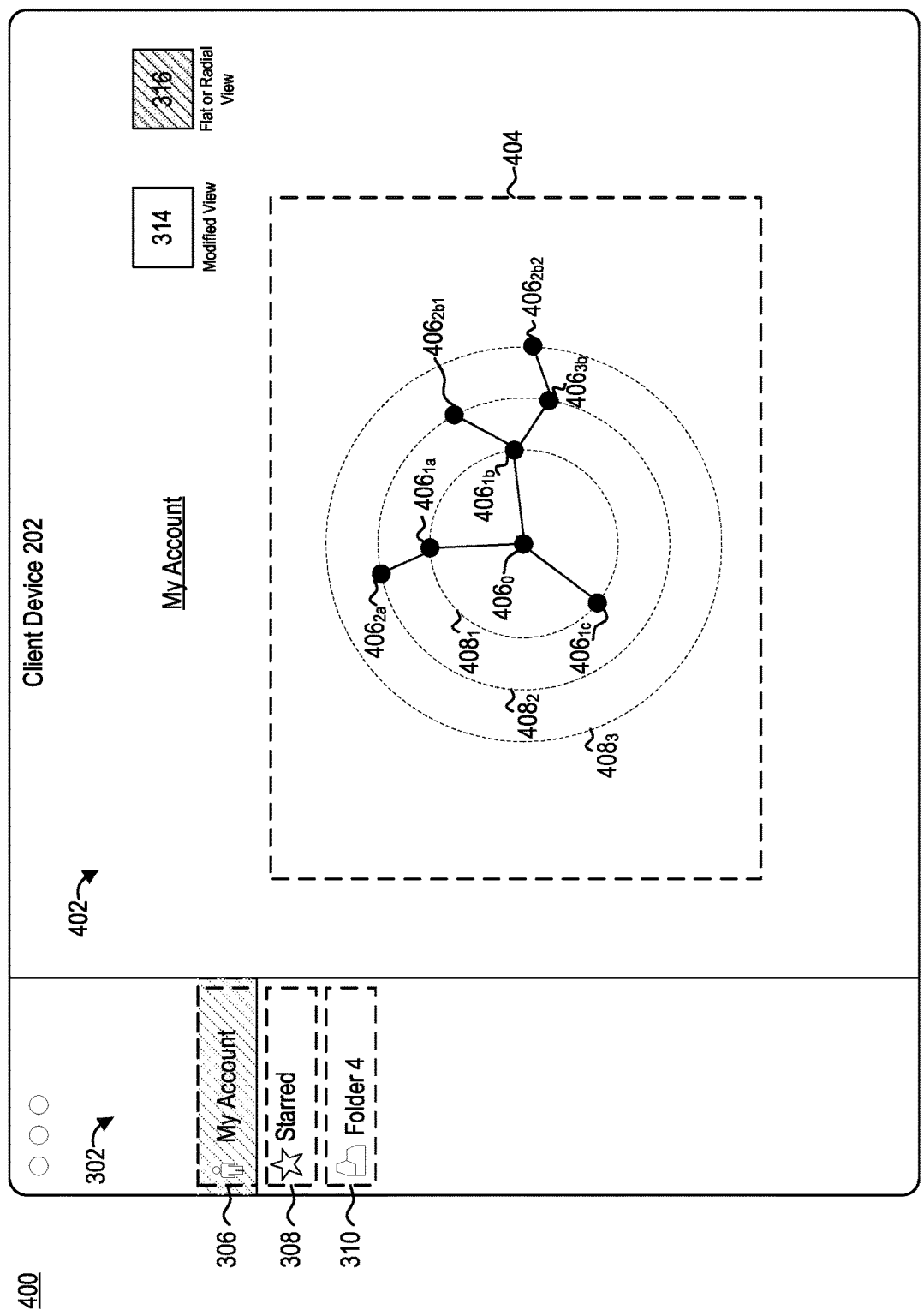
FIG. 4 illustrates an example view of a graphical user interface presenting a flat or radial view, according to example embodiments.

FIG. 4 illustrates an example view of a graphical user interface 400 presenting a flat (or radial) view, according to example embodiments. Graphical user interface 400 (hereinafter "GUI 400") may correspond to GUI 204 and/or GUI 254 of FIG. 2. In some embodiments, GUI 400 may be a web page presented in a web browser application of client device 150. In some embodiments, GUI 400 may be a graphical user interface generated by a native software application executing on client device 150.

As illustrated, GUI 400 may correspond to a flat or radial view of a selected graphical element 306-310. For example, GUI 400 may be generated responsive to a user interacting with graphical element 314 in GUI 300. GUI 400 may include a display portion 402. Display portion 402 may include flat or radial view 404. Flat or radial view 404 may be generated by microservice 234 and sent to client device 150, upon a user selecting graphical element 314. Flat or radial view 404 may include one or more nodes 406. Each node 406 may correspond to a content item associated with the user's account, where the content item can be a folder, a document, a media file, a placeholder file, or any other type of digital data, as discussed above. In some embodiments, each concentric circle may correspond to a node hierarchy. For example, as illustrated, flat or radial view 404 may include three concentric circles $408_1$-$408_3$, representing three levels of folder hierarchy.

Using a specific example, user account may include three first level folders. Accordingly, concentric circle $408_1$ may include nodes $406_{1a}$, $406_{1b}$, and $406_{1c}$. In some embodiments, each of nodes $406_{1a}$, $406_{1b}$, and $406_{1c}$ may be representative of a folder. As illustrated, node $406_{1a}$ may be branched to node $406_{2a}$. In other words, content associated with node $406_{2a}$ may be stored in or associated with the folder corresponding to node $406_{1a}$. In some embodiments, node $406_{2a}$ may be representative of a content item that is not a folder or that is a folder that does not contain any other content items. There may be nothing else stored in the folder corresponding to node $406_{1a}$.

As illustrated, node $406_{1b}$ may be branched to node $406_{2b1}$ and node $406_{2b2}$. In other words, content associated with node $406_{2b1}$ and node $406_{2b2}$ may be stored in or associated with the folder corresponding to node $406_{1b}$. In some embodiments, node $406_{2b1}$ may be representative of a content item that is not a folder or that is a folder that does not contain any other content items. As such, there may not be a branch from node $406_{2b1}$ to concentric circle $408_3$. In some embodiments, node $406_{2b2}$ may be representative of a sub-folder. As illustrated, node $406_{2b2}$ may be branched to node $406_{3b}$. In some embodiments, node $406_{3b}$ may be representative of a content item that is not a folder or that is a folder that does not contain any other content items. As such, there may not be a branch from node $406_b$ to a lower level.

As illustrated, node $406_{1c}$ may correspond to an empty folder, i.e., no information may be stored in or associated with the empty folder. Accordingly, node $406_{1c}$ does not include any branches.

In this manner, a user is able to view the overall file structure associated with the user's account within a single display area. In some embodiments, a user may access (e.g., open), manipulate (e.g., delete, move, rename, etc.), or navigate to any content item illustrated in flat or radial view 404 (i.e., any item within the hierarchy) with a single selection. In some embodiments, a user may be able to collapse or expand a family of nodes 406. For example, assuming a user is focused only on the content items stemming from or associated with node $406_{1a}$, user may collapse nodes $406_{1b}$ and $406_{1c}$ with a single click or instruction.

In some embodiments, flat or radial view 404 may further include the name of the corresponding content item next to each node 406. Further, in some embodiments, flat or radial view 404 may further include additional information associated with the content item next to each node 406, such as, but not limited to, an icon representing the type of content item. Other information associated with each node 406 may be represented through various colors, shapes, or sizes of nodes. In some embodiments, additional information about each node 406 may be accessed by the user (e.g., by right-clicking the node, hovering over the node, etc.).

Figure 5:
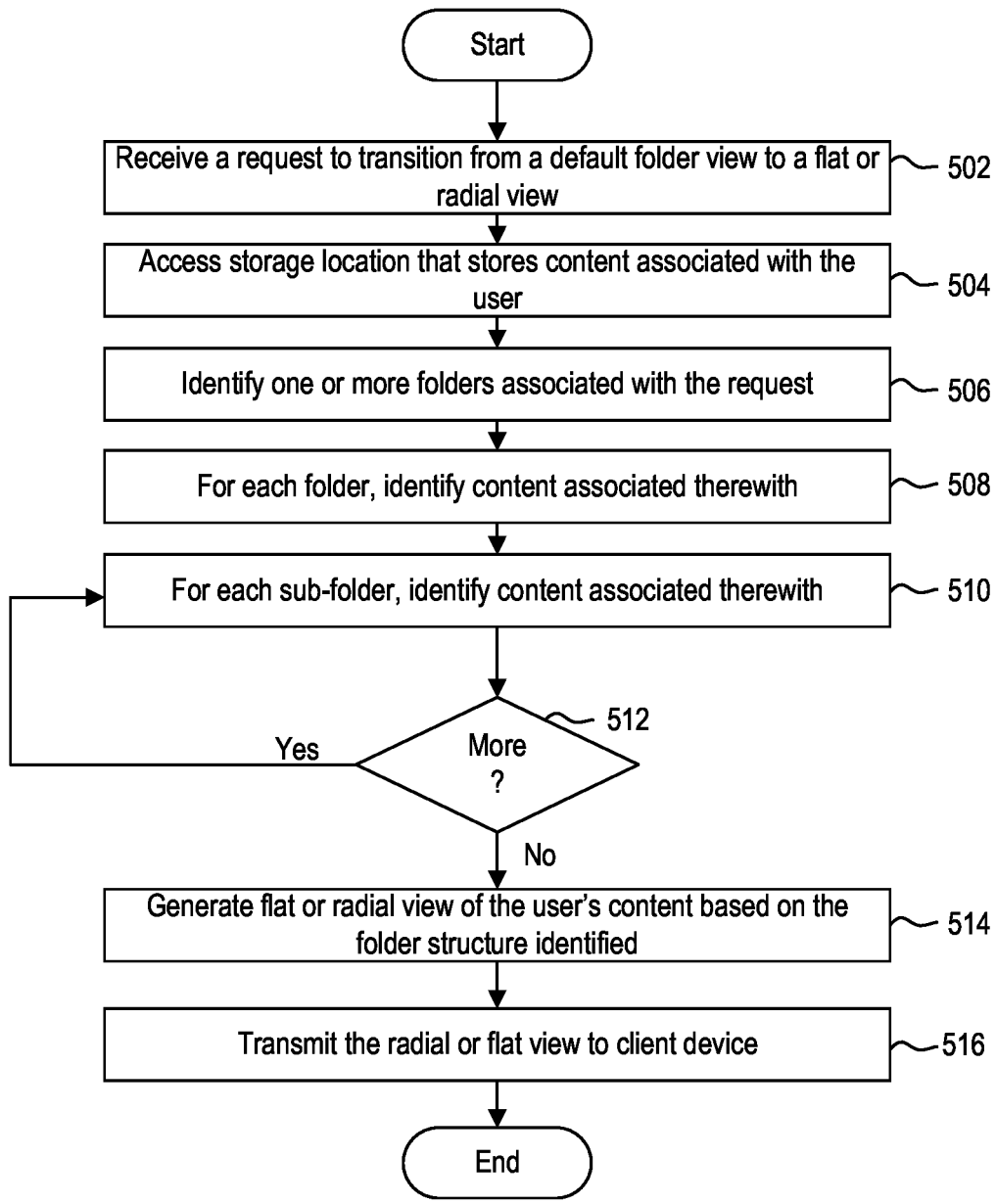
FIG. 5 is a flow diagram illustrating a method of generating a flat or radial view of a selected folder, according to example embodiments.

FIG. 5 is a flow diagram illustrating a method 500 of generating a flat or radial view of a selected folder, according to example embodiments. Method 500 may begin as step 502.

At step 502, content management system 110 may receive a request to convert a default folder view into a flat or radial view. For example, a user may provide input to GUI 300 via graphical element 314 to request the flat or radial view of a currently selected folder from content management service 116. In some embodiments, the request may include a folder identifier corresponding to a folder currently displayed in second portion 304.

At step 504, content management system 110 may access storage location 240 that stores content associated with the user. For example, in some embodiments, microservice 234 may access storage location 240 to identify content associated with the user's namespace. In some embodiments, accessing storage location 240 may involve accessing a certain portion of storage location 240. For example, microservice 234 may determine a current folder view illustrated in second portion 304, and identify content associated with the user's namespace and the folder currently displayed.

At step 506, content management system 110 may identify one or more folders associated with the request. For example, microservice 234 may parse storage location 240 to identify one or more first level folders associated with the user's namespace and the folder or storage location current displayed.

At step 508, content management system 110 may identify, for each folder of the one or more folders, content associated therewith. For example, microservice 234 may parse storage location 240 to identify content associated with each identified folder from step 506. In some embodiments, content may include content items (e.g., documents, collaboration documents, synchronization documents, etc.), sub-folders, workspaces, and the like.

At step 510, content management system 110 may identify, for each subfolder of one or more subfolders, content associated therewith. For example, microservice 234 may parse storage location 240 to identify content associated with each identified sub-folder from step 508. In some embodiments, content may include content items (e.g., documents, collaboration documents, synchronization documents, etc.), sub-folders, workspaces, and the like.

At step 512, for each sub-folder, content management system 110 may determine if any additional content exists (i.e., does the sub-folder contain additional content). If, at step 512, microservice 234 determines that additional content exists (i.e., a sub-folder includes additional content), then method 500 may revert to step 510. If, however, at step 512, microservice 234 determines that additional content does not exist, method 500 may proceed to step 514.

At step 514, content management system 110 may generate a flat or radial view of the user's content based on the folder structure identified in steps 508-512. For example, for each item of content, microservice 234 may generate a node, based on the hierarchy of the content in the underlying folder structure. Each node may include one or more branches, depending on whether additional information is stored in a folder or sub-folder.

At step 516, content management system 110 may transmit the radial or flat view to client device 150 for display thereon. Upon receiving the radial or flat view, client device 150 may render the GUI for display to the user.

Figure 6A:
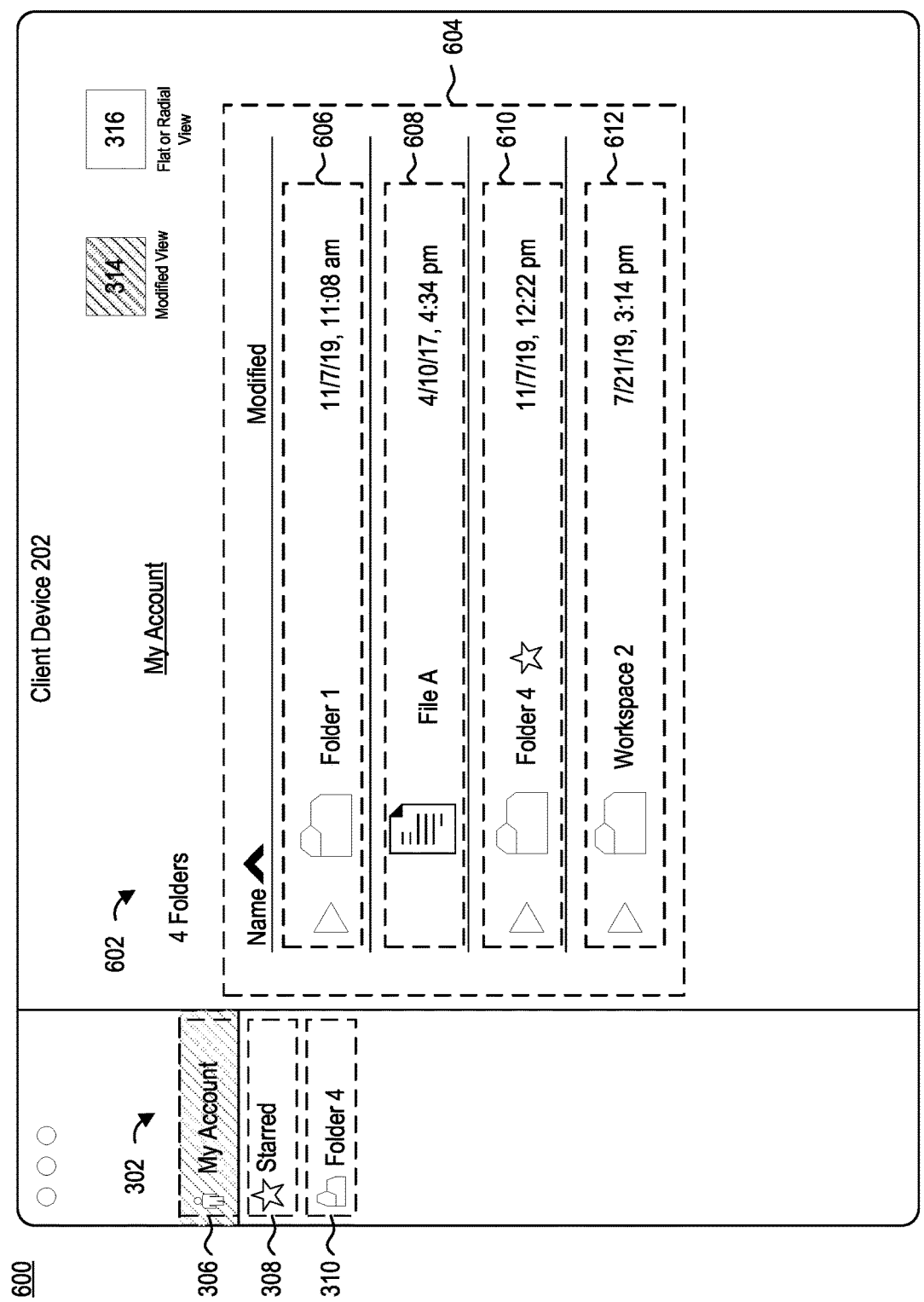
FIG. 6A illustrates an example view of a graphical user interface presenting a modified folder view, according to example embodiments.

FIG. 6A illustrates an example view of a graphical user interface 600 presenting a modified folder view, according to example embodiments. Graphical user interface 600 (hereinafter "GUI 600") may correspond to GUI 204 and/or GUI 254 of FIG. 2. In some embodiments, GUI 600 may be a web page presented in a web browser application of client device 150. In some embodiments, GUI 600 may be a graphical user interface generated by a native software application executing on client device 150.

As illustrated, GUI 600 may correspond to a modified folder view of a user's content. For example, GUI 600 may be generated responsive to a user interacting with graphical element 316 in GUI 300. GUI 600 may include a display portion 602. Display portion 602 may include a modified folder view 604 of the user's content. Modified folder view 604 may be generated by microservice 234 and sent to client device 150 upon user selecting graphical element 314.

To generate modified folder view 604, microservice 234 may work in conjunction with machine learning module 236 to predict a subset of content with which a user is likely to interact or access. For example, based on the currently selected folder (graphical elements 306-310), machine learning module 236 may generate a relevance ranking based on the event or event records in storage location 240. In some embodiments, generating the relevance ranking may include machine learning module 236 scoring content associated with the user based on the retrieved plurality of events or event records. In some embodiments, each record or event record associated with a user's content may contribute a point (or some other amount of points) to that content. In some embodiments, each event or event record may be weighted equally (e.g., each event or event record may be worth a single point). In some embodiments, event or event records may be dynamically weighted.

In some embodiments, predicting the content with which a user is likely to interact or access may include machine learning module 236 identifying a type of device from which the user is submitting a request. For example, each event or event record may include an indication related to the type of device the user initiated the interaction associated with the event or event record. By doing so, microservice 234 may provide a user with the most relevant content, based on the user's interaction with content on the requesting device.

As illustrated, modified folder view 604 may include one or more content items 606-612. Content item 606 may correspond to Folder 1. Content item 608 may correspond to File A. Content item 610 may correspond to starred Folder 4. Content item 612 may correspond to Workspace 2. As previously mentioned, a user may force certain content to be included in a modified view by starring the associated content. Because a user had previously starred Folder 4, when requesting modified folder view 604, microservice 324 may ensure that modified view 604 includes all starred content.

Figure 6B:
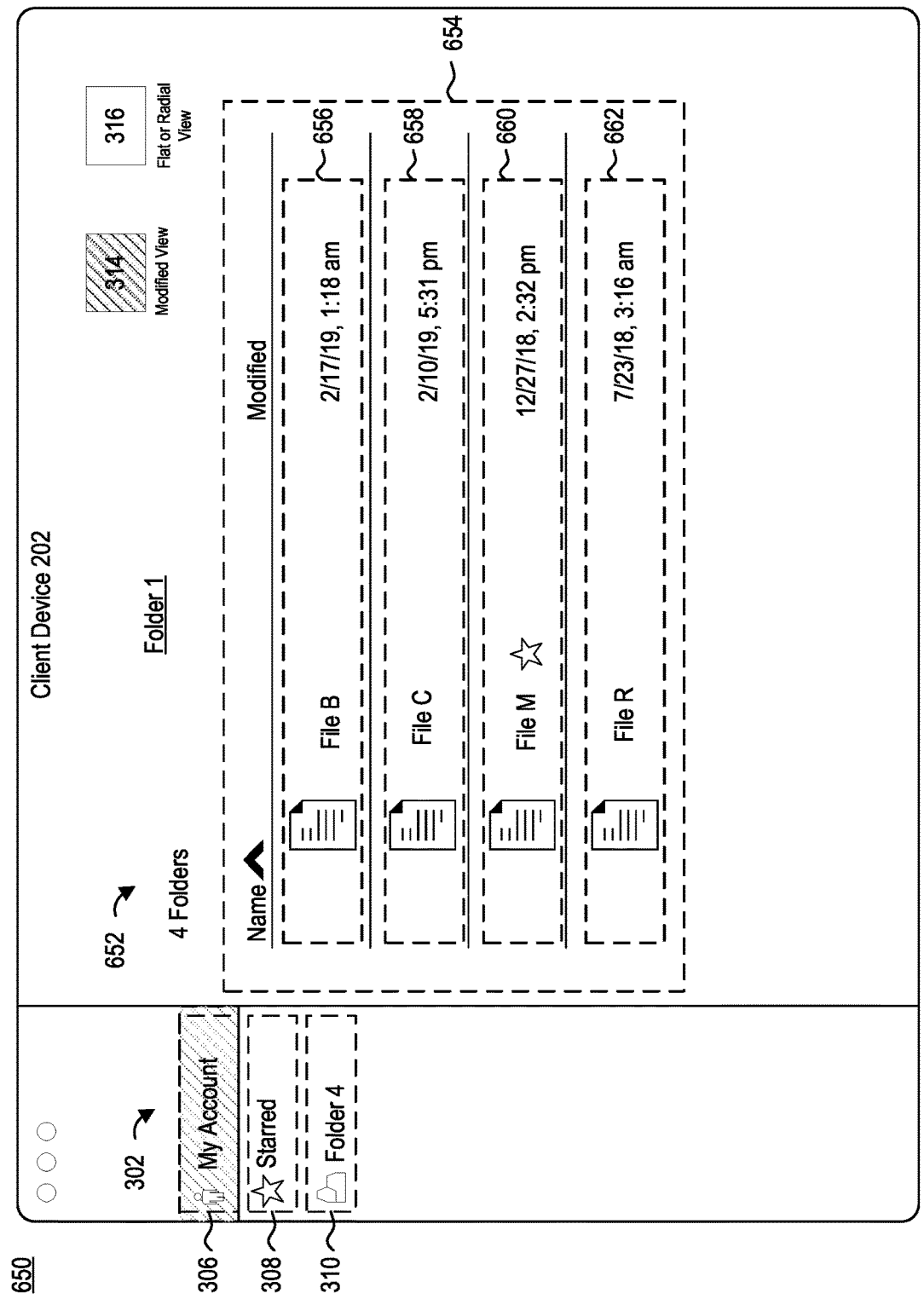
FIG. 6B illustrates an example view of a graphical user interface presenting a modified folder view, according to example embodiments.

FIG. 6B illustrates an example view of a graphical user interface 350 presenting a default view of a selected folder, according to example embodiments. Graphical user interface 650 (hereinafter "GUI 350") may correspond to GUI 204 and/or GUI 254 of FIG. 2. In some embodiments, GUI 650 may be a web page presented in a web browser application of client device 150. In some embodiments, GUI 650 may be a graphical user interface generated by a native software application executing on client device 150.

As illustrated, GUI 650 may correspond to a modified folder view of a Folder 1, upon a user selecting Folder 1 when in the modified view. GUI 650 may include a display portion 652. Display portion 652 may include a modified folder view 654 of the Folder 1. Modified folder view 654 may be generated by microservice 234 and sent to client device 150 upon user selecting graphical element 314.

To generate modified folder view 654, microservice 234 may work in conjunction with machine learning module 236 to predict a subset of content with which a user is likely to interact or access. For example, based on the currently selected folder (e.g., Folder 1), machine learning module 236 may generate a relevance ranking based on the event or event records in storage location 240. In some embodiments, generating the relevance ranking may include machine learning module 236 scoring content associated with the user based on the retrieved plurality of events or event records. In some embodiments, each record or event record associated with a user's content may contribute a point (or some other amount of points) to that content. In some embodiments, each event or event record may be weighted equally (e.g., each event or event record may be worth a single point). In some embodiments, event or event records may be dynamically weighted.

illustrated, modified folder view 604 may include one or more content items 656-662. Content item 656 may correspond to File B. Content item 658 may correspond to File C. Content item 660 may correspond to starred File M. Content item 662 may correspond to File R. As previously mentioned, a user may force certain content to be included in a modified view by starring the associated content. Because a user had previously starred File M, when requesting modified folder view 654, microservice 324 may ensure that modified view 654 includes all starred content.

Figure 7:
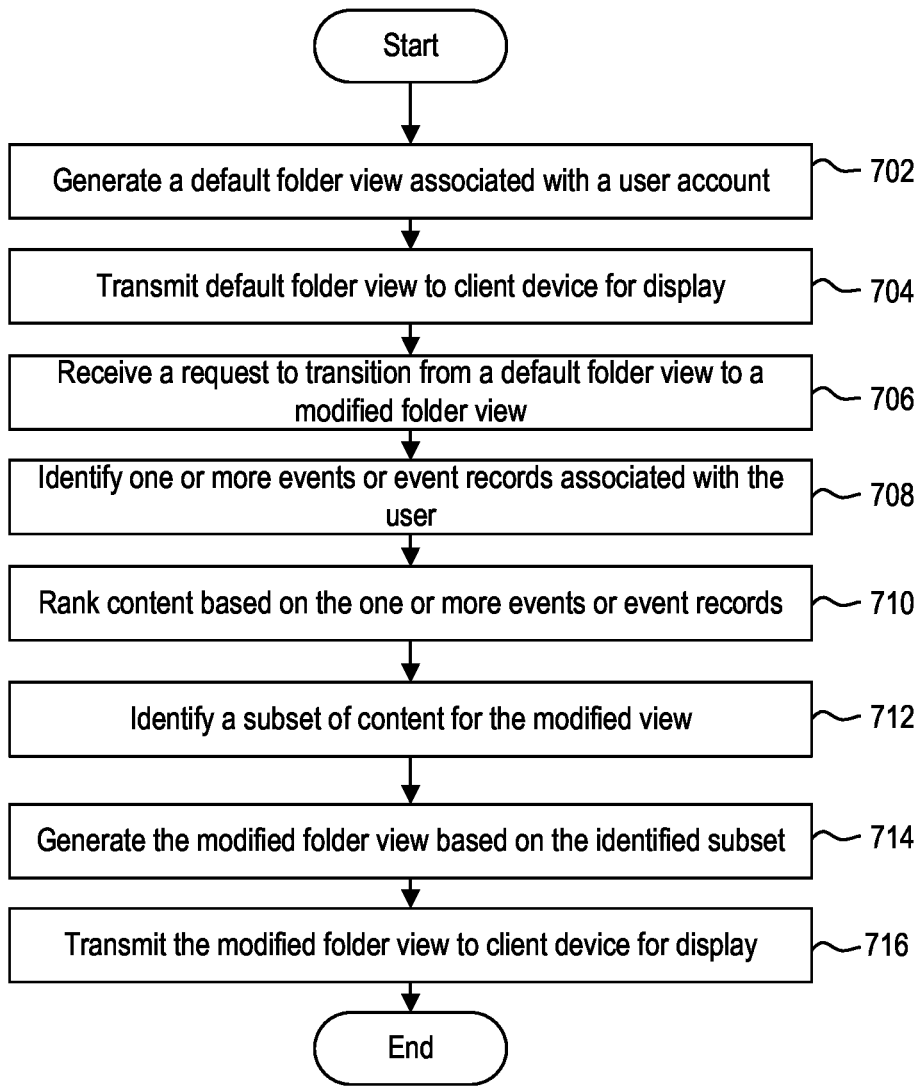
FIG. 7 is a flow diagram illustrating a method of generating a modified folder view of a selected folder, according to example embodiments.

FIG. 7 is a flow diagram illustrating a method 700 of generating a modified folder view of a selected folder, according to example embodiments. Method 700 may begin as step 702.

At step 702, content management system 110 may generate a default folder view associated with a user account. In some embodiments, content management system 110 may generate the default folder view in response to a user selecting a graphical element 306-310. Based on the request, microservice 234 may parse storage location 240 to identify all content associated with the selected folder.

At step 704, content management system 110 may transmit the default folder view to client device 150 for display. Upon receiving the default folder view, client device 150 may render the GUI (e.g., GUI 300) for display to the user.

At step 706, content management system 110 may receive a request to transition from a default folder view into a modified folder view. For example, a user may provide input to GUI 700 via graphical element 316 to request a modified folder view of a currently selected folder from content management service 116. In some embodiments, the request may include a folder identifier corresponding to a folder currently displayed in second portion 304. In some embodiments, the request may not include a folder identifier and instead directed to the user's account, generally.

At step 708, content management system 110 may identify one or more events or event records associated with the user. In some embodiments, microservice 234 may identify one or more events or event records associated with the user's name space. Each event or event record may correspond to a user interaction with a content item and/or another user. Accordingly, cach event or event record may include an event identifier (e.g., unique event identifier), event type, and user identifier (e.g., user identifier and namespace identifier). In some embodiments, the event or event records may include event or event records associated with content shared with the user. For example, events or event records may include actions triggered by the user and actions triggered by collaborators of the user.

At step 710, content management system 110 may rank content based on the one or more events or event records associated with the user. In some embodiments, the ranking may correspond to content with which the user is likely to interact or access. In some embodiments, generating the ranking may include machine learning module 236 scoring content associated with the user based on the retrieved plurality of events or event records. In some embodiments, each record or event record associated with a user's content may contribute a point (or some other amount of points) to that content. In some embodiments, each event or event record may be weighted equally (e.g., each event or event record may be worth a single point). In some embodiments, event or event records may be dynamically weighted (e.g., different points for different actions.

At step 712, content management system 110 may identify a subset of content for the modified view. In some embodiments, microservice 234 may identify a number of content items for the modified folder view based on a user designation. In some embodiments, microservice 234 may identify a number of content items for the modified folder view based on a scoring threshold, i.e., any content with a relevance score that exceeds a threshold is included in the subset. In some embodiments, microservice 234 may identify a number content items for the modified view based on a number designated by content management system 110. In some embodiments, microservice 234 may further include microservice 234 identifying those content items that are starred by the user. For example, microservice 234 may parse the plurality of events or event records to identify which content items have been starred by the user. In some embodiments, each starred item may be included in the subset of content.

At step 714, content management system 110 may identify a subset of content for the modified folder view. For example, microservice 234 may identify a subset of content based on the relevance ranking generated by machine learning module 236. In some embodiments, microservice 234 may identify the subset of content by applying the ranking to the underlying folder structure of the selected content. By applying the ranking to the underlying folder structure of the selected content, microservice 234 may provide the user with the most relevant content within the context of the underlying folder structure.

At step 716, content management system 110 may generate the modified view based on the identified subset of content. For example, microservice 234 may generate a GUI that includes the identified subset of content from steps 712-714. In some embodiments, each content in the identified subset of content displayed via GUI may include path information associated with its location in the underlying folder structure.

At step 718, content management system 110 may transmit the modified folder view to client device 150 for display thereon. Upon receiving the modified folder view, client device 150 may render the GUI for display to the user.

Figure 8A:
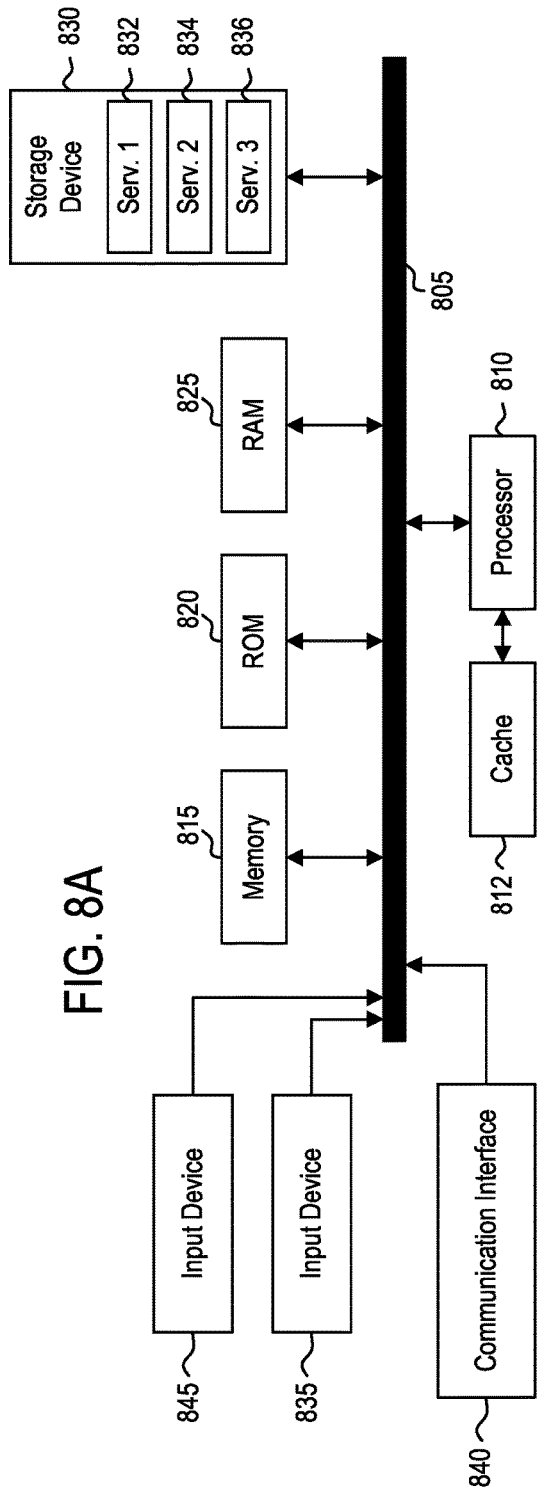
FIG. 8A illustrates an example system configuration for implementing various embodiments of the present technology, according to example embodiments.

FIG. 8A illustrates a system bus computing system architecture 800, according to example embodiments. One or more components of system 800 may be in electrical communication with each other using a bus 805. System 800 may include a processing unit (e.g., one or more CPUs, GPUs or other types of processors) 810 and a system bus 805 that couples various system components including the system memory 815, such as read only memory (ROM) 820 and random access memory (RAM) 825, to processor 810. System 800 can include a cache of high-speed memory connected directly with, in close proximity to, or integrated as part of processor 810. System 800 can copy data from memory 815 and/or storage device 830 to cache 812 for quick access by processor 810. In this way, cache 812 may provide a performance boost that avoids processor 810 delays while waiting for data. These and other modules can control or be configured to control processor 810 to perform various actions. Other system memory 815 may be available for use as well. Memory 815 may include multiple different types of memory with different performance characteristics. Processor 810 may be representative of a single processor or multiple processors. Processor 810 can include one or more of a general purpose processor or a hardware module or software module, such as service 1 832, service 2 834, and service 3 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with computing device 800. Communications interface 840 can generally govern and manage the user input and system output. There is no restriction on operating on any particular hardware arrangement and therefore the basic features here may easily be substituted for improved hardware or firmware arrangements as they are developed.

Storage device 830 may be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 can include services 832, 834, and 836 for controlling the processor 810. Other hardware or software modules are contemplated. Storage device 830 can be connected to system bus 805. In one aspect, a hardware module that performs a particular function can include the software component stored in a computer-readable medium in connection with the necessary hardware components, such as processor 810, bus 805, display 835, and so forth, to carry out the function.

Figure 8B:
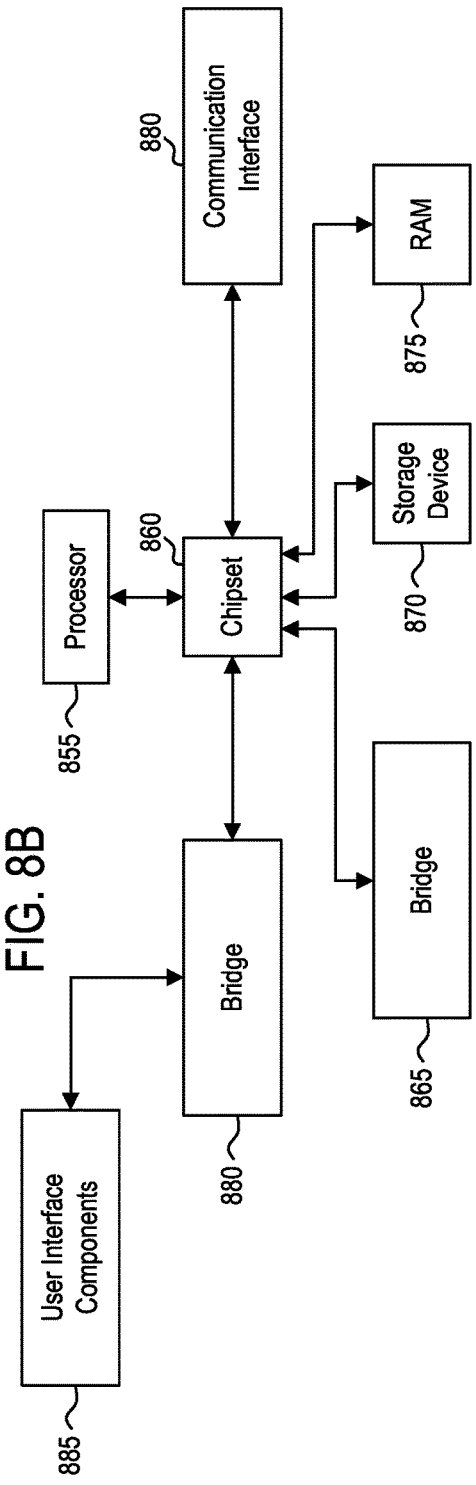
FIG. 8B illustrates an example system configuration for implementing various embodiments of the present technology, according to example embodiments.

FIG. 8B illustrates a computer system 850 having a chipset architecture that can be used in executing the described method and generating and displaying a graphical user interface (GUI). Computer system 850 may be an example of computer hardware, software, and firmware that can be used to implement the disclosed technology. System 850 can include one or more processors 855, representative of any number of physically and/or logically distinct resources capable of executing software, firmware, and hardware configured to perform identified computations. One or more processors 855 can communicate with a chipset 860 that can control input to and output from one or more processors 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 855 analyzing data stored in storage 870 or 875. Further, the machine can receive inputs from a user through user interface components 885 and execute appropriate functions, such as browsing functions by interpreting these inputs using one or more processors 855.

It can be appreciated that example systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed:

1. A computer-implemented method, comprising:
   identifying, by a computing system, a user account and content items associated with the user account;
   generating, by the computing system, for display a first view of a first workspace associated with the user account, the first view comprising a first plurality of content items associated with the first workspace;
   causing to display the generated first view at a graphical user interface of the computing system;
   receiving, by the computing system, a request to transition from the first view of the first workspace to a second view of the first workspace;
   responsive to the request, generating, by the computing system, for display the second view of the first workspace in the graphical user interface of the computing system, the second view comprising a first subset of the first plurality of content items, wherein the first subset is selected from the first plurality of content items based at least in part on a predicted likelihood of interaction with each of the first plurality of content items with the predicted likelihood being based on a plurality of events or a plurality of event records associated with the user account;
   causing to display the generated second view at the graphical user interface of the computing system;
   receiving, by the computing system, a selection of a second workspace in the second view, the second workspace being associated with a second plurality of content items;
   responsive to the selection of the second workspace, generating, by the computing system, for display a third view of the second workspace in the graphical user interface of the computing system, the third view comprising a subset of the second plurality of content items, the subset of the second plurality of content items selected from the second plurality of content items based on a further predicted likelihood of interaction with each of the second plurality of content items with the further predicted likelihood being based on a second plurality of events or a second plurality of event records associated with the user account; and
   causing the display the generated third view at the graphical user interface of the computing system.

2. The computer-implemented method of claim 1, wherein generating, by the computing system, the second view of the first workspace comprises:
   identifying events or event records associated with the user account, wherein each event or each event record corresponds to a user interaction with a respective content item; and
   scoring the respective content item based on the events or the event records corresponding to the respective content item.

3. The computer-implemented method of claim 2, wherein scoring the respective content item based on the events or the event records corresponding to the respective content item comprises:
   applying a trained machine learning model to predict the first subset of the first plurality of content items based on the scoring.

4. The computer-implemented method of claim 3, wherein the trained machine learning model identifies a type of device associated with the request and adjusts the scoring based on the type of device.

5. The computer-implemented method of claim 2, wherein generating, by the computing system, the second view of the first workspace comprises:
   identifying further events or further event records associated with other user accounts, wherein each further event or each further event records corresponds to a further interaction between the other user accounts and the respective content item; and
   scoring the respective content item based on the events or the event records and the further events or the further event records.

6. The computer-implemented method of claim 1, further comprising:
   receiving, by the computing system, a further request to transition from the third view to a default view of the second workspace; and
   responsive to the further request, generating, by the computing system, the default view of the second workspace, the default view comprising the second plurality of content items.

7. The computer-implemented method of claim 1, wherein the second workspace corresponds to a second folder that is a sub-folder of a first folder corresponding to the first workspace.

8. A non-transitory computer readable medium comprising one or more sequences of instructions, which, when executed by a processor, causes a computing system to perform operations comprising:
   generating, by the computing system, a first view of a first workspace associated with a user account, the first view comprising a first plurality of content items associated with the first workspace;
   causing to display the generated first view at a graphical user interface of the computing system;
   receiving, by the computing system, a request to transition from the first view of the first workspace to a second view of the first workspace;
   responsive to the request, generating for display, by the computing system, the second view of the first workspace in the graphical user interface of the computing system, the second view comprising a first subset of the first plurality of content items, wherein the first subset is selected from the first plurality of content items based at least in part on a predicted likelihood of interaction with each of the first plurality of content items with the predicted likelihood being based on a plurality of events or a plurality of event records associated with the user account;

causing to display the generated second view at the graphical user interface of the computing system;

receiving, by the computing system, a selection of a second workspace in the second view, the second workspace being associated with a second plurality of content items;

responsive to the selection of the second workspace, generating for display, by the computing system, a third view of the second workspace in the graphical user interface of the computing system, the third view comprising a subset of the second plurality of content items, the subset of the second plurality of content items selected from the second plurality of content items based on a further predicted likelihood of interaction with each of the second plurality of content items with the further predicted likelihood being based on a second plurality of events or a second plurality of event records associated with the user account; and causing the display the generated third view at the graphical user interface of the computing system.

9. The non-transitory computer readable medium of claim 8, wherein generating, by the computing system, the second view of the first workspace comprises:

identifying events or event records associated with the user account, wherein each event or each event record corresponds to a user interaction with a respective content item; and scoring the respective content item based on the events or the event records corresponding to the respective content item.

10. The non-transitory computer readable medium of claim 9, wherein scoring the respective content item based on the events or the event records corresponding to the respective content item comprises:

applying a trained machine learning model to predict the first subset of the first plurality of content items based on the scoring.

11. The non-transitory computer readable medium of claim 10, wherein the trained machine learning model identifies a type of device associated with the request and adjusts the scoring based on the type of device.

12. The non-transitory computer readable medium of claim 9, wherein generating, by the computing system, the second view of the first workspace comprises:

identifying further events or further event records associated with other user accounts, wherein each further event or each further event records corresponds to a further interaction between the other user accounts and the respective content item; and scoring the respective content item based on the events or the event records and the further events or the further event records.

13. The non-transitory computer readable medium of claim 8, further comprising:

receiving, by the computing system, a further request to transition from the third view to a default view of the second workspace; and responsive to the further request, generating, by the computing system, the default view of the second workspace, the default view comprising the second plurality of content items.

14. The non-transitory computer readable medium of claim 8, wherein the second workspace corresponds to a second folder that is a sub-folder of a first folder corresponding to the first workspace.

15. A system comprising:

one or more processors; and a memory having programming instructions stored thereon, which, when executed by the one or more processors, causes the system to perform operations comprising:

receiving a first request from a user account to access content items associated with the user account;

responsive to receiving the first request, generating a first view for display of a first workspace associated with the user account, the first view comprising a first plurality of content items associated with the first workspace;

causing to display the generated first view at a graphical user interface of a computing system;

receiving a second request to transition from the first view of the first workspace to a second view of the first workspace;

responsive to the second request, generating for display the second view of the first workspace in the graphical user interface of the computing system, the second view comprising a first subset of the first plurality of content items and at least one other content item not in the first plurality of content items, wherein the first subset and the at least one other content item is selected from the content items based at least in part on a predicted likelihood of interaction with each of the content items with the predicted likelihood being based on a plurality of events or a plurality of event records associated with the user account;

causing to display the generated second view at the graphical user interface of the computing system;

receiving a selection of a second workspace in the second view, the second workspace being associated with a second plurality of content items;

responsive to the selection of the second workspace, generating for display a third view of the second workspace in the graphical user interface of the computing system, the third view comprising a subset of the second plurality of content items and at least one additional content item not in the second plurality of content items, wherein the subset of the second plurality of content items and the at least one additional content item is selected from the content items based on a further predicted likelihood of interaction with each of the content items with the further predicted likelihood being based on a second plurality of events or a second plurality of event records associated with the user account; and causing the display the generated third view at the graphical user interface of the computing system.

16. The system of claim 15, wherein generating the second view of the first workspace comprises:

identifying events or event records associated with the user account, wherein each event or each event record corresponds to a user interaction with a respective content item; and scoring the respective content item based on the events or the event records corresponding to the respective content item.

17. The system of claim 16, wherein scoring the respective content item based on the events or the event records corresponding to the respective content item comprises:

applying a trained machine learning model to predict the first subset of the first plurality of content items based on the scoring.

18. The system of claim 17, wherein the trained machine learning model identifies a type of device associated with the second request and adjusts the scoring based on the type of device.

19. The system of claim 16, wherein generating the second view of the first workspace comprises:
   identifying further events or further event records associated with other user accounts, wherein each further event or each further event records corresponds to a further interaction between the other user accounts and the respective content item; and
   scoring the respective content item based on the events or the event records and the further events or the further event records.

20. The system of claim 15, wherein the second workspace corresponds to a second folder that is a sub-folder of a first folder corresponding to the first workspace.

\* \* \* \* \*